United States Patent
Nakamura et al.

(10) Patent No.: US 9,945,750 B2
(45) Date of Patent: Apr. 17, 2018

(54) PRESSURE DETECTION DEVICE

(71) Applicants: CITIZEN FINEDEVICE CO., LTD., Minamitsuru-gun, Yamanashi (JP); CITIZEN HOLDINGS CO., LTD., Tokyo (JP)

(72) Inventors: Rikoku Nakamura, Yamanashi (JP); Masanori Yomoyama, Yamanashi (JP); Hitoshi Satsuta, Yamanashi (JP)

(73) Assignees: CITIZEN FINEDEVICE CO., LTD., Yamanashi (JP); CITIZEN HOLDINGS CO., LTD., Tokyo (JP)

( * ) Notice: Subject to any disclaimer, the term of this patent is extended or adjusted under 35 U.S.C. 154(b) by 59 days.

(21) Appl. No.: 15/129,667

(22) PCT Filed: Mar. 25, 2015

(86) PCT No.: PCT/JP2015/059136
§ 371 (c)(1),
(2) Date: Sep. 27, 2016

(87) PCT Pub. No.: WO2015/147060
PCT Pub. Date: Oct. 1, 2015

(65) Prior Publication Data
US 2017/0131170 A1    May 11, 2017

(30) Foreign Application Priority Data
Mar. 27, 2014    (JP) .................. 2014-067065

(51) Int. Cl.
*G01L 23/20*    (2006.01)
*G01L 23/10*    (2006.01)

(52) U.S. Cl.
CPC .............. *G01L 23/20* (2013.01); *G01L 23/10* (2013.01)

(58) Field of Classification Search
CPC ....... G01L 23/10; G01L 23/20; G01L 23/222; G01L 23/225; F02D 35/023
See application file for complete search history.

(56) References Cited

U.S. PATENT DOCUMENTS

| | | | |
|---|---|---|---|
| 6,439,030 B2 * | 8/2002 | Suzuki | G01L 23/10 73/35.13 |
| 7,042,288 B2 * | 5/2006 | Matsui | G01L 23/10 330/174 |

(Continued)

FOREIGN PATENT DOCUMENTS

| | | |
|---|---|---|
| JP | 2002-62211 A | 2/2002 |
| JP | 2013-140048 A | 7/2013 |

OTHER PUBLICATIONS

International Search Report for PCT/JP2015/059136 (PCT/ISA/210) dated Apr. 21, 2015.

(Continued)

*Primary Examiner* — Freddie Kirkland, III
(74) *Attorney, Agent, or Firm* — Birch, Stewart, Kolasch & Birch, LLP

(57) ABSTRACT

A processing circuit is provided which includes at least an integrator circuit which uses a reference voltage set to have a predetermined magnitude as an operation reference and which integrates a detection signal so as to convert the detection signal into a voltage waveform and a base voltage adjustment circuit which is connected between an input terminal and an output terminal of the integrator circuit and which adjusts the magnitude of a base voltage that is a potential when the detection signal in an output signal output from the integrator circuit is not present. As another form, a processing circuit can be adopted which includes at least one or more amplifier circuits which amplify an output signal from an integrator circuit and a base voltage adjustment circuit which is connected between a supply portion of a (Continued)

reference voltage fed to the amplifier circuit and an input terminal of at least one of the amplifier circuits and which adjusts the magnitude of a base voltage that is a potential when a detection signal in an output signal output from the amplifier circuit is not present.

13 Claims, 7 Drawing Sheets

(56) References Cited

U.S. PATENT DOCUMENTS

| | | | |
|---|---|---|---|
| 7,049,729 B2* | 5/2006 | Kashiwase | G01L 23/222 |
| | | | 123/395 |
| 2001/0052337 A1* | 12/2001 | Suzuki | G01L 23/10 |
| | | | 123/435 |
| 2017/0146421 A1* | 5/2017 | Nakamura | G01L 23/10 |
| 2017/0153161 A1* | 6/2017 | Yomoyama | G01L 23/222 |

OTHER PUBLICATIONS

Written Opinion of the International Searching Authority for PCT/JP2015/059136 (PCT/ISA/237) dated Apr. 21, 2015.

* cited by examiner

PRESSURE DETECTION DEVICE

TECHNICAL FIELD

The present invention relates to a pressure detection device which is suitably used when a pressure such as the combustion pressure of an engine is detected.

BACKGROUND ART

In general, a pressure detection device is known which is fitted to an engine and which uses a piezoelectric element or the like as a sensor to detect a combustion pressure within a combustion chamber. Since the sensor outputs a signal obtained by differentiating a pressure, the pressure detection device includes a processing circuit which converts a detection signal from the sensor into voltage similar to a variation in the pressure by integration with an integrator circuit.

Conventionally, as the processing circuit included in such a pressure detection device, a signal processing device of a piezoelectric sensor disclosed in patent literature 1 is known. FIG. 11 shows a schematic diagram of an integrator circuit in a pressure detection device which is disclosed in patent literature 1 and which detects the combustion pressure of an engine. In the integrator circuit 100 shown in FIG. 11, one terminal of a combustion pressure sensor 101 is connected through a capacitor 102 and a resistor 103 to the inverting input terminal of an operational amplifier 104, and the other terminal of the combustion pressure sensor 101 is connected to the GND of the circuit. On the other hand, the non-inverting input terminal of the operational amplifier 104 is connected to a reference power supply 105 to feed a reference voltage Vr. Between the inverting input terminal and the output terminal of the operational amplifier 104, a parallel circuit of a charge capacitor 106 and a discharge resistor 107 with a high resistance value is connected.

FIG. 12 is a waveform diagram illustrating the operation of the integrator circuit 100, the horizontal axis represents time t, the vertical axis of FIG. 12(a) represents a charge signal Qi from the combustion pressure sensor 101 and the vertical axis of FIG. 12(b) represents the output signal Vout of the integrator circuit 100. The combustion pressure sensor 101 detects a pressure to generate the charge signal Qi of a differentiated waveform shown in FIG. 12(a) at a predetermined period T01. Then, the charge signal Qi is fed to the integrator circuit 100. The integrator circuit 100 is operated using the reference voltage Vr from the reference power supply 105 as a reference, and the charge signal Qi is converted by integration into a voltage. In this way, at the output terminal of the operational amplifier 104, the output signal Vout of a voltage waveform similar to a variation in the pressure shown in FIG. 12(b) is obtained. When the charge signal Qi is transferred to the negative side, the output signal Vout is changed according to an ascending curve whereas when the charge signal Qi is transferred to the positive side, the output signal Vout is changed according to a descending curve. As described above, since the integrator circuit 100 integrates and outputs the charge signal Qi of the differentiated waveform, the voltage waveform of the output signal Vout is a waveform similar to a variation in the pressure detected by the combustion pressure sensor 101, with the result that it is possible to detect the combustion pressure.

CITATION LIST

Patent Literature

JP-No. 2002-62211

SUMMARY OF INVENTION

Technical Problem

However, in the signal processing device (processing circuit) disclosed in patent literature 1 described above, the following problems are present.

Specifically, when the signal processing device is used as the pressure detection device which detects the combustion pressure in automobile engine, it is likely that the following problems occur. In general, in order to acquire safety and reliability, an automobile includes, in this type of pressure detection device, a failure diagnosis means for grasping a failure. For example, when the output voltage range of an output signal in the pressure detection device falls within a region of 0.5 V to 4.5 V, the pressure detection device is determined to be in a normal state whereas when the output signal is equal to or less than 0.5 V or is equal to or more than 4.5 V, the pressure detection device is determined to be in a failure state. Then, when the pressure detection device is determined to be in the failure state, the corresponding necessary processing is performed. Hence, in order to enhance the reliability of such a failure diagnosis means, it is extremely important that the output signal of the pressure detection device should continue to be stably operated at a normal time in the range of 0.5 V to 4.5 V which is a normal region.

However, in the signal processing device disclosed in patent literature 1 described above, the following failure is encountered. The potential of a base voltage Vb in the output signal Vout of the integrator circuit 100 is displaced with respect to the potential of the reference voltage Vr which is the operation reference of the integrator circuit 100, and thus the potential is varied by the magnitude and the repetition period of the output signal Vout. In this case, the base voltage Vb refers to the voltage level (see FIG. 12(b)) of the output signal Vout when the charge signal Qi is not present. The reason why a displacement is produced between the base voltage Vb and the reference voltage Vr is that the output signal Vout is corrected by charge and discharge with the charge capacitor 106 and the discharge resistor 107 in the integrator circuit 100 within one period T01 with the reference voltage Vr in the center such that the area of voltage× time is ±0, and as a result, a so-called sinking phenomenon occurs in which the base voltage Vb of the output signal Vout is displaced with respect to the potential of the reference voltage Vr.

The sinking phenomenon in the output signal Vout will be specifically described below with reference to FIGS. 13 and 14. In the illustrated case, the reference voltage Vr is 1.0 V, the normal region of the output signal Vout is the range of 0.5 V to 4.5 V and a failure diagnosis range is equal to or less than 0.5 V or is equal to or more than 4.5 V.

FIG. 13(a) shows an output signal Vout01 when the magnitude of the charge signal Qi generated at the period T01 is relatively small. In this case, since the crest value of the output signal Vout01 is decreased, the sinking phenomenon of a base voltage Vb01 is reduced. Specifically, although charge and discharge with the charge capacitor 106 and the discharge resistor 107 is performed with the reference voltage Vr in the center, since the crest value of the output signal Vout01 is relatively low, the area Su1 of the output signal Vout01 exceeding the reference voltage Vr is decreased, with the result that the area Sd1 of the base voltage Vb01 equal to or less than the reference voltage Vr is decreased.

On the other hand, FIG. 13(b) shows an output signal Vout02 when the magnitude of the charge signal Qi generated at the period T01 is relatively large. In this case, since the crest value of the output signal Vout02 is increased, the sinking phenomenon of a base voltage Vb02 is increased. Specifically, since the crest value of the output signal Vout02 is relatively increased, the area Su2 of the output signal Vout02 exceeding the reference voltage Vr is increased, with the result that the area Sd2 of the base voltage Vb02 equal to or less than the reference voltage Vr is increased. Consequently, the base voltage Vb02 enters the failure diagnosis region set equal to or less than 0.5 V, and thus the pressure detection device is determined to be in the failure state.

Although the influence of the magnitude of the charge signal Qi is described above, the influence of a variation in the repetition period of the charge signal Qi is also present. FIG. 14(a) shows an output signal Vout03 when the repetition period T03 of the charge signal Qi is relatively long. In this case, since the repetition period T03 is relatively long, the sinking phenomenon of the base voltage Vb03 is reduced. Specifically, the ratio Tu3 of the time during which the output signal Vout03 exceeds the reference voltage Vr in one period is relatively decreased, and accordingly, the ratio Td3 of the time during which the base voltage Vb03 is equal to or less than the reference voltage Vr is increased, with the result that the amount of sinking of the base voltage Vb03 is decreased by averaging.

On the other hand, FIG. 14(b) shows an output signal Vout04 when the repetition period T04 of the charge signal Qi is relatively short. In this case, since the repetition period T04 of the output signal Vout04 is relatively short, the sinking phenomenon of the base voltage Vb04 is increased. Specifically, the ratio Tu4 of the time during which the output signal Vout04 exceeds the reference voltage Vr in one period is relatively increased, and accordingly, the radio Td4 of the time during which the base voltage Vb04 is equal to or less than the reference voltage Vr is decreased, with the result that the amount of sinking of the base voltage Vb04 is increased. Consequently, the base voltage Vb04 enters the failure diagnosis region set equal to or less than 0.5 V, and thus the pressure detection device is determined to be in the failure state.

As described above, in the signal processing device as disclosed in patent literature 1, according to the magnitude of the charge signal Qi from the combustion pressure sensor and the variation in the repetition period, the potential of the base voltage Vb of the output signal Vout is varied. Hence, depending on the use conditions, the base voltage Vb enters the failure diagnosis region, and thus the pressure detection device may be erroneously determined to have a failure, with the result that this is a non-negligible problem in terms of ensuring reliability. Moreover, when the potential of the base voltage Vb is varied, the magnitude (peak voltage value) of the output signal Vout is also varied, with the result that it is disadvantageously impossible to perform accurate pressure detection.

The present invention has an object to provide a pressure detection device which solves the problems present in the background technology described above.

Solution to Problem

In order to solve the foregoing problems, according to the present invention, there is provided a pressure detection device 10 including: a pressure detection element 21 which receives a pressure P so as to output a detection signal Qi corresponding to the pressure P; and a processing circuit which processes and outputs the detection signal Qi output from the pressure detection element 21, where the processing circuit 30 includes at least: an integrator circuit which uses a reference voltage Vr set to have a predetermined magnitude as an operation reference and integrates the detection signal Qi so as to convert the detection signal Qi into a voltage waveform; and a base voltage adjustment circuit 40 which is connected between an input terminal and an output terminal of the integrator circuit and adjusts the magnitude of a base voltage Vb1 that is a potential when the detection signal Qi in an output signal Vout1 output from the integrator circuit is not present.

In order to solve the foregoing problems, according to another aspect of the present invention, there is provided a pressure detection device 10 including: a pressure detection element 21 which receives a pressure P so as to output a detection signal Qi corresponding to the pressure P; and a processing circuit which processes and outputs the detection signal Qi output from the pressure detection element 21, where the processing circuit 50, 70 includes: an integrator circuit which uses a reference voltage Vr set to have a predetermined magnitude as an operation reference and integrates the detection signal Qi so as to convert the detection signal Qi into a voltage waveform; at least one or more amplifier circuits which use a reference voltage Vr set to have a predetermined magnitude as an operation reference and amplify an output signal Vout21, Vout31 from the integrator circuit; and a base voltage adjustment circuit 40 which is connected between a supply portion of the reference voltage Vr fed to the amplifier circuit and an input terminal of at least one of the amplifier circuits and adjusts the magnitude of a base voltage Vb22, Vb33 that is a potential when the detection signal Qi in the output signal Vout22, Vout33 output from the amplifier circuit is not present.

On the other hand, according to a preferred aspect of the present invention, the base voltage adjustment circuit 40 can be formed with a transistor pair using a pnp transistor 41 and an npn transistor 42. Here, as the transistor pair, complementary transistors are preferably used. The base voltage adjustment circuit 40 can adjust the magnitude of the base voltage Vb1 such that the base voltage Vb1 is equal to the reference voltage Vr. Furthermore, the integrator circuit can be formed with a computation amplifier circuit 31 which is operated with a single power supply.

Advantageous Effects of Invention

In the pressure detection device 10 configured as described above and according to the present invention, the following remarkable effects are provided.

(1) Since the processing circuit 30 includes at least: the integrator circuit which uses the reference voltage Vr set to have a predetermined magnitude as an operation reference and integrates the detection signal Qi so as to convert the detection signal Qi into a voltage waveform; and the base voltage adjustment circuit 40 which is connected between an input terminal and an output terminal of the integrator circuit and adjusts the magnitude of the base voltage Vb1 that is a potential when the detection signal Qi in the output signal Vout1 output from the integrator circuit is not present, even when the magnitude and the repetition period of the detection signal Qi obtained from the piezoelectric element 21 are varied, the base voltage Vb1 in the output signal Vout1 can be constantly maintained to be constant. In this way, it is possible to remove the failure in which the output signal Vout1 enters the failure diagnosis region to make an erroneous determination, and it is also possible to perform highly accurate and stable pressure detection, with the result that it is possible to provide the pressure detection device 10 excellent in reliability.

(2) In a preferred aspect, the base voltage adjustment circuit 40 is formed with a transistor pair using the pnp transistor 41 and the npn transistor 42, and thus since the pnp transistor 41 and the npn transistor 42 individually perform operations for cancelling out the temperature properties, even when a temperature variation is produced, the potentials are balanced by the base voltage adjustment circuit 40 with the coupling point A of the emitter of the pnp transistor 41 and the base of the npn transistor 42 in the center, with the result that it is possible to reduce a variation in the base voltage Vb1 caused by the temperature variation.

(3) In a preferred aspect, as the transistor pair, complementary transistors are used, and thus the properties of the complementary transistors are made constant, with the result that it is possible to easily form a preferable transistor pair.

(4) In a preferred aspect, the base voltage adjustment circuit 40 can adjust the magnitude of the base voltage Vb1 such that the base voltage Vb1 is equal to the reference voltage Vr, and thus since the base voltage Vb1 and the reference voltage Vr can be constantly maintained to be constant, it is possible to reliably avoid a failure in which the base voltage Vb1 is equal to or less than the reference voltage Vr due to the sinking phenomenon.

(5) In a preferred aspect, the integrator circuit is formed with a computation amplifier circuit 31 which is operated with a single power supply, and thus since it is possible to perform the operation only with the integrator circuit formed with the one computation amplifier circuit (operational amplifier), it is possible to reduce the number of components, to reduce the size and weight and to reduce a failure risk. Moreover, since the potential of the output signal Vout1 can be stabilized, it is possible to realize highly accurate and highly stable pressure detection.

REFERENCE SIGNS LIST

10: pressure detection device, 21: pressure detection element (piezoelectric element), 30: processing circuit, 31: computation amplifier circuit, 40: base voltage adjustment circuit, 41: pnp transistor, 42: npn transistor, 50: processing circuit, 70: processing circuit, P: pressure, Qi: detection signal (charge signal), Vr: reference voltage, Vout1: output signal, Vout21: output signal, Vout31: output signal, Vout 22: output signal, Vout33: output signal, Vb1: base voltage, Vb22: base voltage, Vb33: base voltage

DESCRIPTION OF EMBODIMENTS

Preferred embodiments according to the present invention will then be described in detail with reference to drawings.

As embodiments, four different embodiments will be illustrated. A first embodiment describes a configuration in which an independent pressure detection device is fitted to an engine and in which the processing circuit of the pressure detection device is formed with an integrator circuit and a base voltage adjustment circuit. A second embodiment describes a configuration in which the pressure detection device is fitted to the engine as in the first embodiment and in which the processing circuit of the pressure detection device is formed with the integrator circuit, one amplifier circuit and the base voltage adjustment circuit. A third embodiment describes a configuration in which the pressure detection device is fitted to the engine as in the first embodiment and in which the processing circuit of the pressure detection device is formed with the integrator circuit, two amplifier circuits and the base voltage adjustment circuit. A fourth embodiment describes a configuration in which the detection portion of the pressure detection device is incorporated in a fuel injection device, and thus the pressure detection device is fitted to the engine.

An example of the engine to which the pressure detection device according to the first to third embodiments can be fitted will first be described with reference to FIG. 1.

Figure 1:
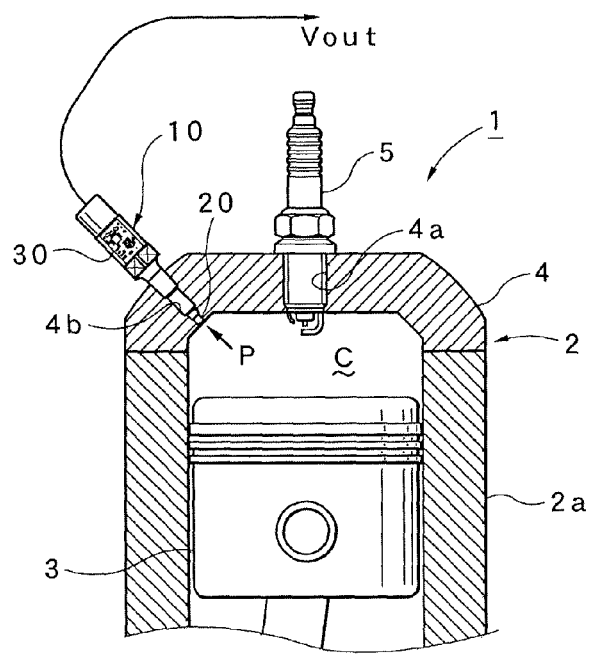
FIG. 1 is a schematic configuration diagram showing an engine to which a pressure detection device according to the first to third embodiments that are preferred embodiments of the present invention is fitted.

In FIG. 1, symbol 1 represents an automobile engine to which the pressure detection device according to the present embodiment is fitted. The engine 1 includes a cylinder block 2 which has a cylinder 2a, a piston 3 which reciprocates within the cylinder 2a and a cylinder head 4 which is coupled to the cylinder block 2 to form a combustion chamber C together with the cylinder 2a, the piston 3 and the like. In the cylinder head 4, a communication hole 4a is formed, a spark plug 5 is fitted to perform ignition for detonating an air-fuel mixture within the combustion chamber C, in another position of the cylinder head 4, a communication hole 4b is formed and the pressure detection device 10 according to the present embodiment is fitted. Although not illustrated, the fuel injection device for injecting fuel into the combustion chamber C is fitted to the cylinder head 4.

The pressure detection device 10 is formed in the shape of a cylinder, and has a detection portion 20 at the tip end. The detection portion 20 is inserted into the communication hole 4b, and the tip end is made to face the interior of the combustion chamber C. In this way, the detection portion 20 receives an internal pressure (combustion pressure: arrow P) within the combustion chamber C, and outputs a detection signal corresponding to the internal pressure. In the pressure detection device 10, a processing circuit 30 is incorporated, performs processing on the detection signal fed from the detection portion 20 and outputs, as an output signal Vout, the detection signal to an unillustrated external engine control portion.

The schematic mechanical configuration of the pressure detection device 10 according to the first to third embodiments will then be described with reference to FIG. 2.

Figure 2:
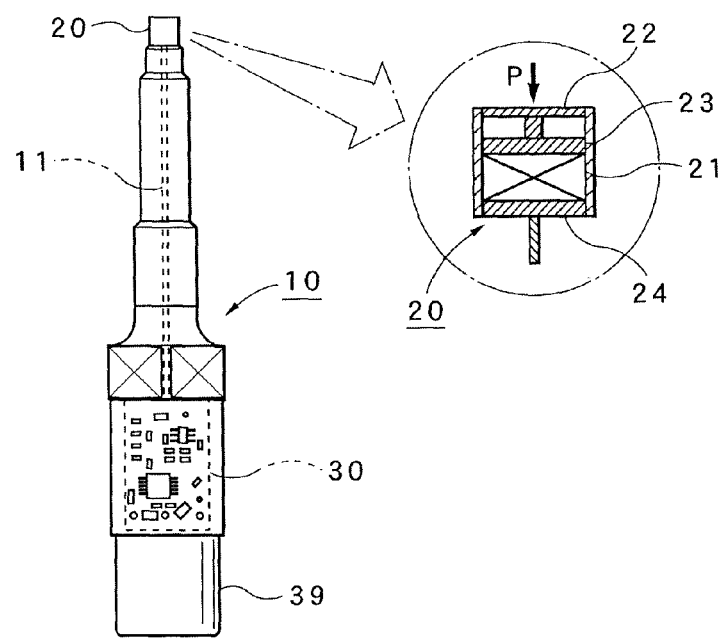
FIG. 2 is a side view showing an overall configuration of the pressure detection device and an enlarged cross-sectional view of a detection portion.

In FIG. 2, the tip end of the pressure detection device 10 is formed in the shape of a thin cylinder, and the detection portion 20 for detecting the combustion pressure is provided at the tip end. In the vicinity of the lower end of the pressure detection device 10 (a lower portion in the figure), the processing circuit 30 is arranged, the processing circuit 30 and the detection portion 20 are connected with a conductive portion 11 indicated by broken lines and the detection signal from the detection portion 20 is transmitted to the processing circuit 30. As the conductive portion 11, for example, a metal bar or a cable can be utilized. The processing circuit 30 is incorporated in the pressure detection device 10, and is shown with a perspective view so that the figure explicitly shows that a plurality of electronic components are mounted. Furthermore, a connector portion 39 is adjacent to the processing circuit 30, and in the connector portion 39, an unillustrated electrode terminal for outputting, to the outside, the output signal Vout from the processing circuit 30 shown in FIG. 1 is provided.

The figure shown in FIG. 2 and enclosed by a circle is an enlarged cross-sectional view of the detection portion 20 taken along a direction perpendicular to the axis. At the uppermost tip end portion of the detection portion 20, a diaphragm 22 is provided, a base 23 is in close contact with the diaphragm 22 and a piezoelectric element 21 forming a pressure detection element is in close contact with the base 23. In this way, when a combustion pressure P is produced within the combustion chamber C shown in FIG. 1, a displacement in the diaphragm 22 receiving the combustion pressure P is transmitted through the base 23 to the piezoelectric element 21 as a compression force, the piezoelectric element 21 receiving the compression force outputs a charge signal Qi. The charge signal Qi is fed as the detection signal to the processing circuit 30 through the conductive portion 11 connected to an electrode 24. As described above, in the pressure detection device 10 described in the first to third embodiments, the detection portion 20 and the processing circuit 30 are integrally formed, and the pressure detection device 10 is fitted to the engine 1 as an independent pressure detection device 10, with the result that the pressure detection device 10 is easily fitted and that maintenance properties are excellent.

FIRST EMBODIMENT

The pressure detection device 10 according to the first embodiment will then be specifically described with reference to FIGS. 3 and 4.

Figure 3:
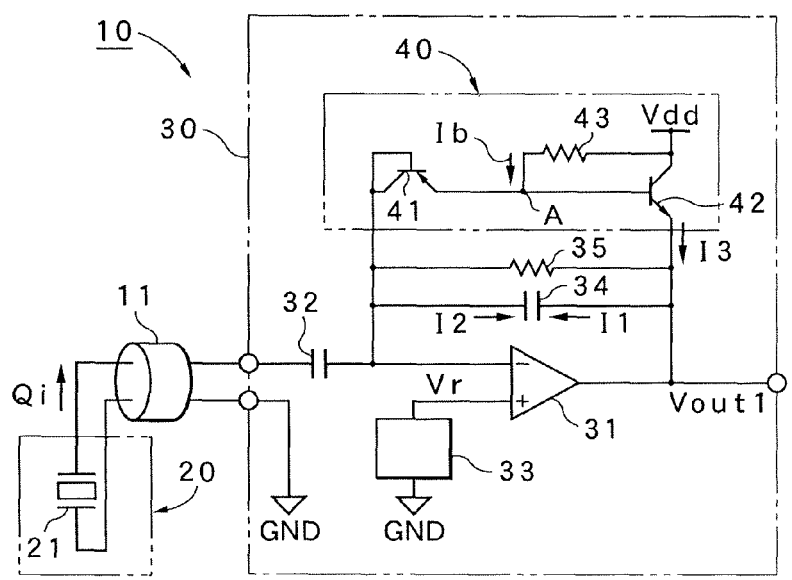
FIG. 3 is a schematic circuit diagram of the processing circuit of the pressure detection device according to the first embodiment of the present invention.
Figure 4:
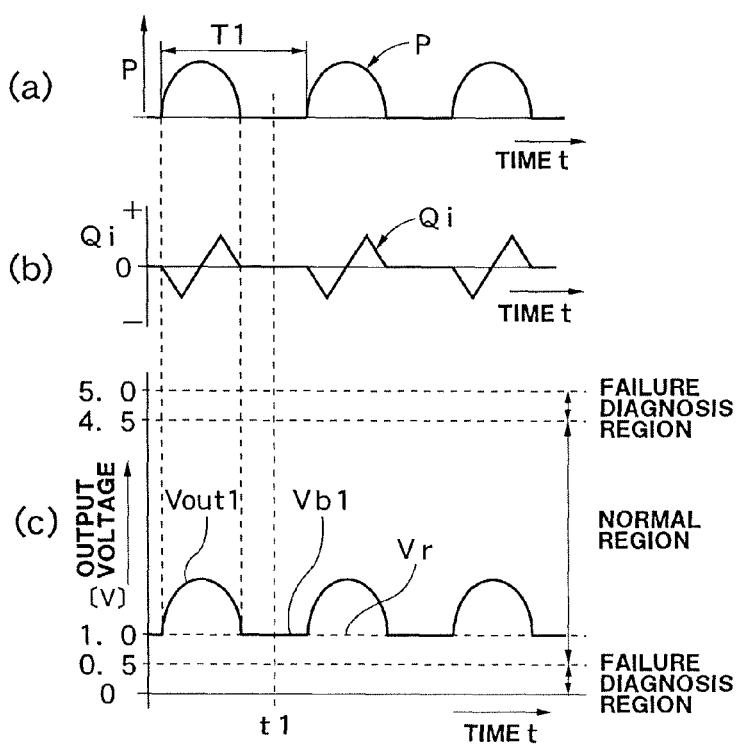
FIG. 4 is a signal waveform diagram illustrating the operation of the pressure detection device.

The pressure detection device 10 shown in FIG. 3 includes the detection portion 20 and the processing circuit 30. The detection portion 20 includes the piezoelectric element (pressure detection element) 21 which detects the combustion pressure P of the engine 1 shown in FIG. 1. As shown in FIG. 2, the piezoelectric element 21 is arranged within the detection portion 20, and outputs the charge signal (detection signal) Qi. One terminal of the piezoelectric element 21 is connected through the conductive portion 11 to the processing circuit 30, and the other terminal is connected through the conductive portion 11 to the GND of the processing circuit 30. In this way, the charge signal Qi is fed through the conductive portion 11 to the processing circuit 30.

The processing circuit 30 includes an integrator circuit formed with one operational amplifier 31 which is operated with a single power supply (in the illustrated example, Vdd=5V). The charge signal Qi from the piezoelectric element 21 is fed through a capacitor 32 to the inverting input terminal of the operational amplifier 31, and a reference voltage Vr which is generated by a reference power supply 33 and is set to have a predetermined magnitude is fed to the non-inverting input terminal of the operational amplifier 31. The illustrated reference voltage Vr is DC 1.0V. The inverting input terminal of the operational amplifier 31 and the output terminal of the operational amplifier 31 are connected with a parallel circuit of a charge capacitor 34 and a discharge resistor 35 with a high resistance value. An output signal Vout1 is output from the output terminal of the operational amplifier 31.

As described above, the integrator circuit is formed with the computation amplifier circuit 31 which is operated with a single power supply, and thus the operation can be performed only with the integrator circuit formed with one computation amplifier circuit (operational amplifier), with the result that it is possible to reduce the number of components, to reduce the size and weight and to reduce a failure risk. Moreover, since the potential of the output signal Vout1 can be stabilized, it is possible to realize highly accurate and highly stable pressure detection.

In this case, the capacitance value of the charge capacitor 34 is determined such that when a predetermined combustion pressure P is applied to the piezoelectric element 21, the output signal Vout1 has an appropriate magnitude. The discharge resistor 35 is provided so that a variation in base voltage which will be described later is prevented from being produced by summation of input leakage current. Since the discharge resistor 35 and the charge capacitor 34 form a high pass filter, as the time constant RC thereof, a value which is sufficiently long as compared with the frequency range of the combustion pressure P to be measured is preferably selected.

Between the inverting input terminal and the output terminal of the operational amplifier 31, a base voltage adjustment circuit 40 is connected which is a characteristic part of the present invention. The base voltage adjustment circuit 40 is formed with a transistor pair of a pnp transistor 41 and an npn transistor 42. In this case, as the transistor pair, complementary transistors whose properties are constant are used. In this way, it is possible to easily form a preferable transistor pair. In the illustrated base voltage adjustment circuit 40, the base and the collector of the pnp transistor 41 are connected, and are further connected to the inverting input terminal of the operational amplifier 31. The emitter of the pnp transistor 41 is connected to the base of the npn transistor 42. On the other hand, the collector of the npn transistor 42 is connected to a power supply Vdd, and the emitter of the npn transistor 42 is connected to the output terminal of the operational amplifier 31. Furthermore, the collector and the base of the npn transistor 42 are connected with a bias resistor 43.

Hence, in the processing circuit 30, the integrator circuit is formed with the operational amplifier 31 using the reference voltage Vr as the operation reference, and the processing circuit 30 has the function of integrating the charge signal Qi fed from the piezoelectric element 21, converting it into voltage and outputting it as the output signal Vout1.

The operation of the pressure detection device 10 according to the first embodiment will then be described with reference to a waveform diagram shown in FIG. 4 and FIG. 3.

FIG. 4(a) shows a relationship of the combustion pressure P received by the piezoelectric element 21 with respect to time t. The illustrated combustion pressure P is repeatedly produced at a period T1. When the pressure detection device 10 is fitted to the engine 1 shown in FIG. 1, the period T1 of the combustion pressure P is varied according to the number of revolutions of the engine 1. Specifically, when the number of revolutions of the engine 1 is increased, the period T1 is decreased whereas when the number of revolutions of the engine 1 is lowered, the period T1 is increased. Hence, when the combustion pressure P of the engine 1 mounted on an automobile or the like is detected with the pressure detection device 10, the period T1 is changed over time as the number of revolutions is increased or decreased.

FIG. 4(b) shows a relationship of the charge signal Qi which is the output of the piezoelectric element 21 in the detection portion 20 receiving the combustion pressure P with respect to time t. Since the piezoelectric element 21 detects a variation in the combustion pressure P as a differential value, the charge signal Qi which is output has a differentiated waveform. An example is described in which when the combustion pressure P is increased, the charge signal Qi is transferred to the negative side whereas when the combustion pressure P is lowered, the charge signal Qi is transferred to the positive side. However, this polarity can be reversed by changing the connection of the piezoelectric element 21. The charge signal Qi is fed through the capacitor 32 to the inverting input terminal of the operational amplifier 31 in the processing circuit 30.

Figure 11:
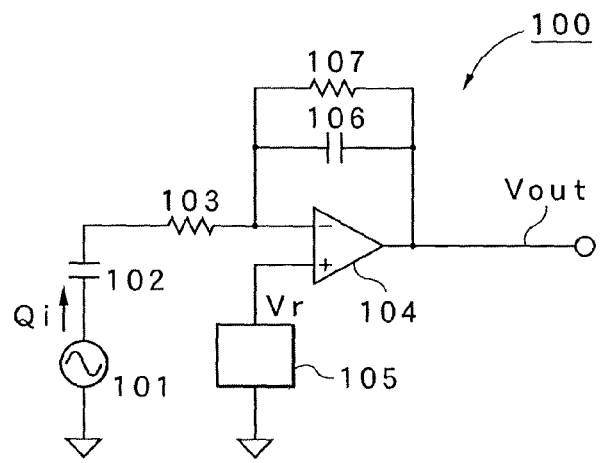
FIG. 11 is an overview diagram of an integrator circuit in the pressure detection device of a background technology.
Figure 12:
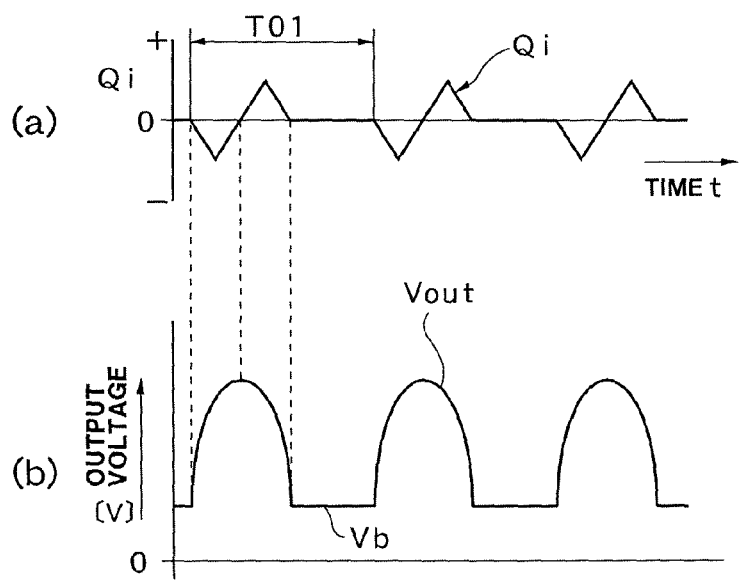
FIG. 12 is a signal waveform diagram illustrating the operation of the integrator circuit in the pressure detection device.

FIG. 4(c) shows a relationship of the output signal Vout1 obtained from the output terminal of the operational amplifier 31 in the processing circuit 30 with respect to time t. In this case, as with the conventional integrator circuit 100 shown in FIG. 11, the processing circuit 30 is operated using the reference voltage Vr from the reference power supply 33 as the reference, integrates the charge signal Qi which is input to convert it into voltage and outputs the output signal Vout1 similar to a variation in the pressure from the output terminal of the operational amplifier 31.

In other words, since the potential of the output terminal of the operational amplifier 31 is increased when the charge signal Qi is transferred to the negative side, a charging current I1 shown in FIG. 3 flows through the charge capacitor 34. In this way, as shown in FIG. 4(c), the output signal Vout1 is changed according to an ascending curve. On the other hand, since the potential of the output terminal of the operational amplifier 31 is lowered when the charge signal Qi is transferred to the positive side, a discharge current I2 shown in FIG. 3 flows through the charge capacitor 34. In this way, the output signal Vout1 is changed according to a descending curve. As described above, since the processing circuit 30 is operated as the integrator circuit, and integrates and outputs the charge signal Qi with the differentiated waveform, the output signal Vout1 is voltage which has a waveform similar to a variation in the combustion pressure P received by the piezoelectric element 21.

On the other hand, the operation of the base voltage adjustment circuit 40 included in the processing circuit 30 is as follows. It is assumed that the transistor pair of the pnp transistor 41 and the npn transistor 42 are the complementary transistors whose properties are constant.

Now, when the charge signal Qi is not present (see time t1 in FIG. 4(c)), the potential of the output signal Vout1 from the output terminal is changed such that the inverting input terminal and the non-inverting input terminal of the operational amplifier 31 are equal in potential to each other, and thus the inverting input terminal is equal in potential to the reference voltage Vr input to the non-inverting input terminal, and the output signal Vout1 is equal in potential to the reference voltage Vr. In other words, when reference voltage Vr=1.0 V, the potential of the non-inverting input terminal=the potential of the inverting input terminal=the potential of the output signal Vout1=1.0 V, and thus the potential of the operational amplifier 31 is in a well-balanced state.

Here, in the base voltage adjustment circuit 40, a bias current Ib from a bias resistor 43 connected to the power supply Vdd flows into the emitter of the pnp transistor 41, and part thereof flows as a base current, with the result that the pnp transistor 41 is turned on. In this way, the potential of a coupling point A of the emitter of the pnp transistor 41 and the base of the npn transistor 42 is (the potential of the inverting input terminal of the operational amplifier 31: the reference voltage Vr)+(the forward voltage of the pnp transistor 41).

Here, when it is assumed that the forward voltage VBE of each of the pnp transistor 41 and the npn transistor 42 which are complementary is 0.6 V, the potential of the coupling point A is the reference voltage Vr=1.0 V, and thus (the reference voltage Vr: 1.0 V)+(the forward voltage of the pnp transistor 41: 0.6 V)=1.6 V. Since the forward voltage of the npn transistor 42 is also 0.6 V, the potential of the emitter thereof, that is, the potential of the output signal Vout1 of the output terminal of the operational amplifier 31 is (the potential of the coupling point A: 1.6 V)−(the forward voltage of the npn transistor 42: 0.6 V)=1.0 V (which is equal to the reference voltage Vr). Consequently, in the base voltage adjustment circuit 40, with the coupling point A in the center, the potentials of the base and the emitter of the pnp transistor 41 and the potential (1.0 V) of the emitter of the npn transistor 42 are equal to each other, with the result that the potentials are balanced.

As described above, when the charge signal Qi is not present, since the operation of the operational amplifier 31 and the operation of the base voltage adjustment circuit 40 are balanced, the potential of the output signal Vout1 which is the output of the operational amplifier 31 is maintained to be 1.0 V which is equal to the reference voltage Vr.

On the other hand, it is assumed that in this state, the potential of the output signal Vout1 of the operational amplifier 31 is lowered below the reference voltage Vr. In this case, since the voltage between the base and the emitter of the npn transistor 42 in the base voltage adjustment circuit 40 is higher than the forward voltage, the bias current Ib from the bias resistor 43 flows through the base of the npn transistor 42, with the result that the npn transistor 42 is turned on. In this way, an emitter current I3 shown in FIG. 3 flows from the power supply Vdd through the npn transistor 42, and thus the potential of the output signal Vout1 output from the output terminal of the operational amplifier 31 is increased so as to be equal to the reference voltage Vr.

Then, when the potential of the output signal Vout1 slightly exceeds the reference voltage Vr, since the voltage between the base and the emitter of the transistor 42 becomes equal to or less than the forward voltage, the transistor 42 is returned to the off-state. Consequently, the potential of the output signal Vout1 is (the potential of the coupling point A)–(the forward voltage of the npn transistor 42), and thus 1.0 V (the reference voltage Vr) is maintained.

As shown in FIG. 4(b), the actual charge signal Qi has the differentiated waveform at the predetermined period T1 by the combustion pressure P, and thus the charge signal Qi is input to the integrator circuit of the operational amplifier 31, and as shown in FIG. 4(c), the integrator circuit outputs the output signal Vout1 whose waveform is similar to a variation in the pressure. In this case, at the time of no signal (see time t1) between the charge signals Qi which is periodically produced, the base voltage Vb1 of the output signal Vout1 is equal to or less than the reference voltage Vr due to the sinking phenomenon described previously but the emitter current I3 flows by the operation (function) of the base voltage adjustment circuit 40, with the result that the potential of the output signal Vout1 is increased. Consequently, the base voltage Vb1 is maintained to be equal in potential to the reference voltage Vr without being displaced from the reference voltage Vr. In other words, since the base voltage adjustment circuit 40 adjusts the magnitude of the base voltage Vb1 such that the base voltage Vb1 and the reference voltage Vr are equal to each other, the potentials of the base voltage Vb1 and the reference voltage Vr are constantly maintained to be equal to each other, with the result that it is possible to reliably avoid a failure in which the base voltage Vb1 is equal to or less than the reference voltage Vr due to the sinking phenomenon.

The base voltage adjustment circuit 40 is operated only when the base voltage Vb1 of the output signal Vout1 is equal to or less than the reference voltage Vr. In other words, when the base voltage Vb1 of the output signal Vout1 reaches the potential of the reference voltage Vr by the operation of the base voltage adjustment circuit 40, the npn transistor 42 is immediately turned off, with the result that the base voltage adjustment circuit 40 is not affected by the integral waveform of the output signal Vout1.

Figure 13:
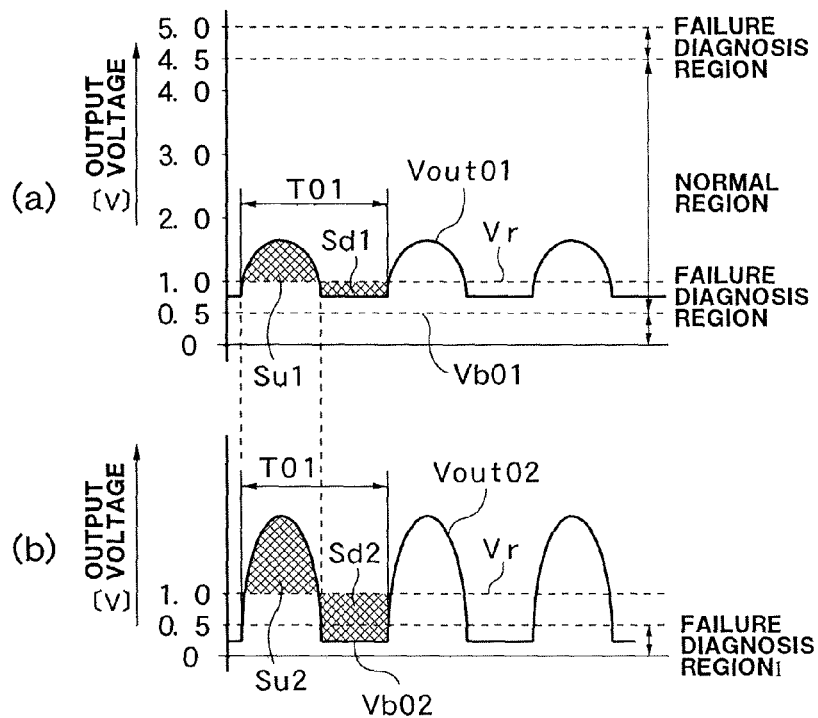
FIG. 13 is a signal waveform diagram illustrating a problem in the pressure detection device of the background technology.
Figure 14:
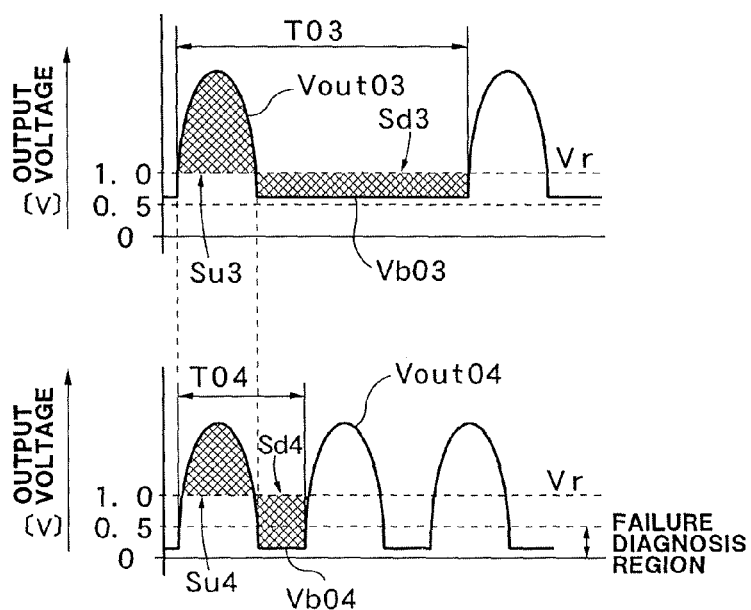
FIG. 14 is Another signal waveform diagram illustrating the problem in the pressure detection device of the background technology.

As described above, in the output signal Vout of the integrator circuit 100 in the background technology shown in FIGS. 13 and 14, the base voltage Vb is lowered beyond the reference voltage Vr and the potential thereof is significantly varied by differences in the magnitude of the charge signal Qi and the repetition period. However, in the processing circuit 30 of the first embodiment, in the output signal Vout1, the base voltage Vb1 is prevented from being displaced with respect to the reference voltage Vr by the operation (function) of the base voltage adjustment circuit 40. In this way, even when the magnitude of the charge signal Qi and the repetition period are changed, the potential equal to the reference voltage Vr is maintained, with the result that the failure is removed in which the output signal Vout1 of the processing circuit 30 enters the failure diagnosis region.

Moreover, although the forward voltages of the pnp transistor 41 and the npn transistor 42 individually have specific temperature properties, since the pnp transistor 41 and the npn transistor 42 individually perform operations for cancelling out the temperature properties, even when temperature variation is produced, the potentials are balanced by the base voltage adjustment circuit 40 with the coupling point A of the emitter of the pnp transistor 41 and the base of the npn transistor 42 in the center, with the result that it is possible to reduce a variation in the base voltage Vb1 caused by the temperature variation.

As described above, the processing circuit 30 of the first embodiment includes at least: the integrator circuit which integrates the detection signal Qi using the reference voltage Vr set to have a predetermined magnitude as the operation reference so as to convert it into a voltage waveform; and the base voltage adjustment circuit 40 which is connected between the input terminal and the output terminal of the integrator circuit and adjusts the magnitude of the base voltage Vb1 that is a potential when the detection signal Qi in the output signal Vout1 output from the integrator circuit is not present. Hence, the processing circuit 30 is operated such that the base voltage Vb1 of the output signal Vout1 is constantly equal to the reference voltage Vr. Consequently, even when the magnitude and the repetition period of the detection signal Qi obtained from the piezoelectric element 21 are varied, the base voltage Vb1 in the output signal Vout1 can be constantly maintained to be constant. In this way, it is possible to remove the failure in which the output signal Vout1 enters the failure diagnosis region to make an erroneous determination, and it is also possible to perform highly accurate and stable pressure detection, with the result that it is possible to provide the pressure detection device 10 excellent in reliability.

SECOND EMBODIMENT

A pressure detection device 10 according to the second embodiment will then be specifically described with reference to FIGS. 5 and 6.

Figure 5:
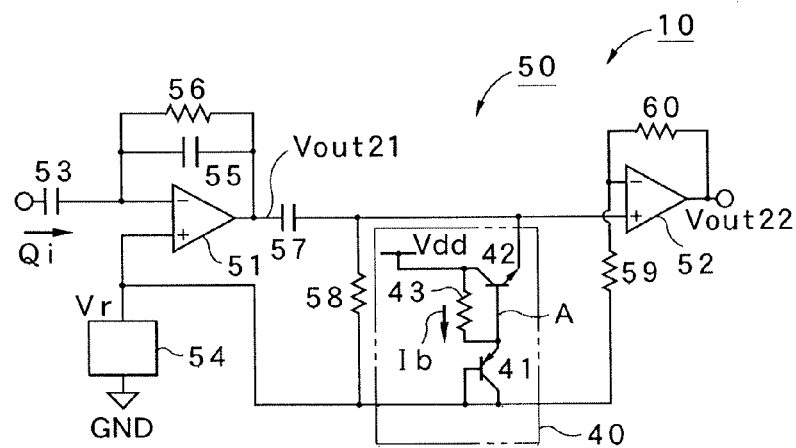
FIG. 5 is a schematic circuit diagram of the processing circuit of a pressure detection device according to the second embodiment of the present invention.
Figure 6:
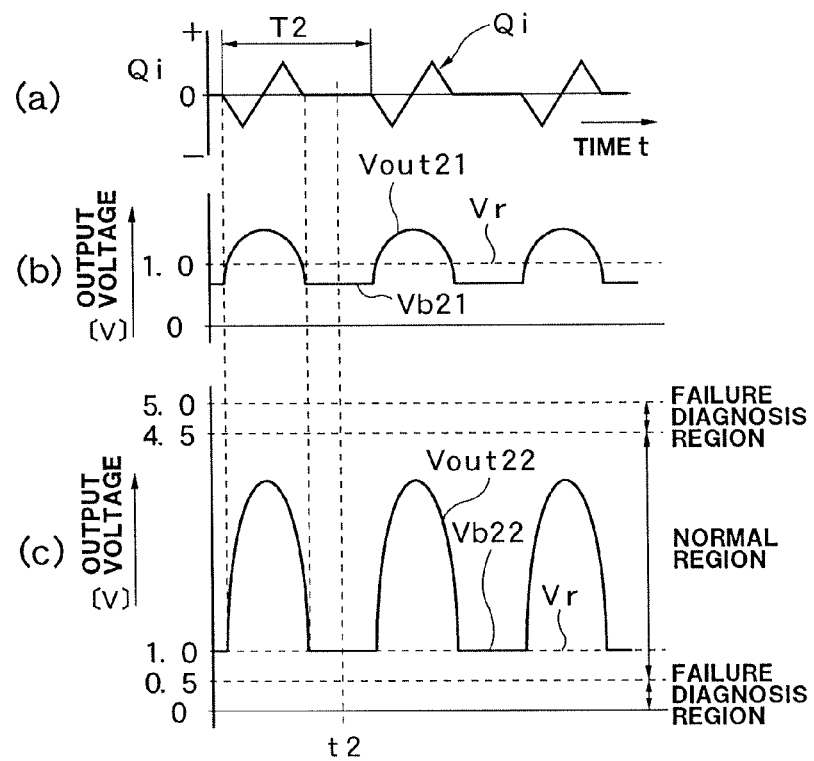
FIG. 6 is a signal waveform diagram illustrating the operation of the pressure detection device.

FIG. 5 shows only a processing circuit 50 which is extracted from the pressure detection device 10. The configuration of the detection portion 20 for detecting the combustion pressure P is the same as in the first embodiment. The processing circuit 50 of the second embodiment shown in FIG. 5 includes two operational amplifiers which are an operational amplifier 51 and an operational amplifier 52 and are operated with a single power supply (for example, Vdd=5V). In this case, the operational amplifier 51 forms the integrator circuit, and the operational amplifier 52 forms the amplifier circuit. In this way, the charge signal Qi obtained from the piezoelectric element 21 shown in FIG. 3 is fed through a capacitor 53 to the inverting input terminal of the operational amplifier 51 forming the integrator circuit. On the other hand, the reference voltage Vr from a reference power supply 54 is fed to the non-inverting input terminal of the operational amplifier 51. The illustrated reference voltage Vr is DC 1.0V.

The inverting input terminal and the output terminal of the operational amplifier 51 are connected with a parallel circuit of a charge capacitor 55 and a discharge resistor 56 with a high resistance value. In this way, the integrator circuit is formed which uses the reference voltage Vr as the reference and is formed with the operational amplifier 51, and an output signal Vout21 obtained by integrating the charge signal Qi and converting it into voltage is output from the output terminal of the operational amplifier 51. Furthermore, the output signal Vout21 from the operational amplifier 51 is fed through a capacitor 57 to the non-inverting input terminal of the operational amplifier 52 forming the amplifier circuit, and the reference voltage Vr is fed through a resistor 58 to the non-inverting input terminal. The inverting input terminal of the operational amplifier 52 is connected through a resistor 59 to the reference voltage Vr, and is connected through a resistor 60 to the output terminal. In this way, the operational amplifier 52 is operated as a non-inverting amplifier circuit using the reference voltage Vr as the reference, and the amplified output signal Vout22 is output from the output terminal. The amplification factor is determined by a ratio between the resistance values of the resistor 59 and the resistor 60.

On the other hand, between the non-inverting input terminal of the operational amplifier 52 and the reference voltage Vr, the base voltage adjustment circuit 40 is connected which is the characteristic part of the present invention. The base voltage adjustment circuit 40 has the same circuit configuration as the base voltage adjustment circuit 40 in the first embodiment. Hence, the same portions are identified with the same symbols, and the description of the internal circuit configuration will be omitted. As in the first embodiment, the base voltage adjustment circuit 40 is formed with the transistor pair of the pnp transistor 41 and the npn transistor 42. Hence, as the transistor pair, the complementary transistors whose properties are constant are used. The emitter of the npn transistor 42 in the base voltage adjustment circuit 40 is connected to the non-inverting input terminal of the operational amplifier 52, and the base and the collector of the pnp transistor 41 are connected to the reference voltage Vr.

Hence, in the processing circuit 50, the integrator circuit is formed with the operational amplifier 51, the charge signal Qi fed from the piezoelectric element 21 is integrated and converted into voltage and the voltage is output as the output signal Vout21. The amplifier circuit is formed with the operational amplifier 52, and the amplifier circuit has the function of outputting the output signal Vout22 amplified at a predetermined amplification factor.

The operation of the pressure detection device 10 according to the second embodiment will then be described with reference to a waveform diagram shown in FIG. 6 and FIG. 5.

FIG. 6(a) shows a relationship of the charge signal Qi which is the output of the piezoelectric element 21 of the detection portion 20 receiving the combustion pressure P with respect to time t. The charge signal Qi is fed through the capacitor 53 to the inverting input terminal of the operational amplifier 51 in the processing circuit 50. FIG. 6(b) shows an example of the voltage waveform of the output signal Vout21 obtained from the output terminal of the operational amplifier 51 in the processing circuit 50. In this case, as with the operational amplifier 31 of the first embodiment shown in FIG. 3, the operational amplifier 51 is operated using the reference voltage Vr as the reference, integrates the charge signal Qi to convert it into voltage and outputs, from the output terminal, the output signal Vout21 similar to a variation in the pressure.

As in the first embodiment described previously, the output signal Vout21 is corrected by charge and discharge with the charge capacitor 55 of the operational amplifier 51 and the discharge resistor 56 within one period with the reference voltage Vr in the center such that the area of voltage×time is ±0, and thus the sinking phenomenon occurs in which the base voltage Vb21 is displaced from the reference voltage Vr. FIG. 6(c) shows an example of the voltage waveform of the output signal Vout22 output from the output terminal of the operational amplifier 52 in the processing circuit 50. Since the operational amplifier 52 is operated as a non-inverting amplifier circuit as described previously, the magnitude (crest value) of the output signal Vout22 is a magnitude which is obtained by magnifying the output signal Vout21 at a predetermined amplification factor.

The base voltage Vb22 of the output signal Vout22 is equal to the reference voltage Vr by the operation (function) of the base voltage adjustment circuit 40, and is thereby stabilized.

The operation of the base voltage adjustment circuit 40 is as follows. Now, when the charge signal Qi is not present (see time t2 in FIG. 6(c)), the non-inverting input terminal of the operational amplifier 52 is equal in potential to the reference voltage Vr by the resistor 58, and the inverting input terminal of the operational amplifier 52 is also equal in potential to the reference voltage Vr by the resistor 59. In this way, the output signal Vout22 from the output terminal of the operational amplifier 52 is also equal in potential to the reference voltage Vr. In other words, when reference voltage Vr=1.0 V, the potential of the non-inverting input terminal=the potential of the inverting input terminal=the potential of the output signal Vout22=1.0 V, and thus the potential of the operational amplifier 52 is in a well-balanced state.

Here, in the base voltage adjustment circuit 40, as in the first embodiment, since the pnp transistor 41 is in the on-state, the potential of the coupling point A of the emitter of the pnp transistor 41 and the base of the npn transistor 42 is (the reference voltage Vr)+(the forward voltage of the pnp transistor 41). In other words, as in the first embodiment, the potential of the coupling point A=1.0 V+0.6 V=1.6 V. Since the forward voltage of the npn transistor 42 is equal to the forward voltage of the pnp transistor 41, the potential of the non-inverting input terminal of the operational amplifier 52 to which the emitter of the npn transistor 42 is connected is (the potential of the coupling point A: 1.6 V)−(the forward voltage of the npn transistor 52: 0.6 V)=1.0 V (which is equal to the reference voltage Vr), with the result that the potential of the base voltage adjustment circuit 40 is balanced with the coupling point A in the center. Consequently, the non-inverting input terminal of the operational amplifier 52 is maintained to be equal in potential to the reference voltage Vr. As described above, when the charge signal Qi is not present, since the operation of the operational amplifier 52 and the operation of the base voltage adjustment circuit 40 are balanced, the potential of the output signal Vout22 which is the output of the operational amplifier 52 is maintained to be 1.0 V which is equal to the reference voltage Vr.

On the other hand, it is assumed that in this state, as shown in FIG. 6(a), the charge signal Qi appears at a predetermined period T2. As described previously, the integrator circuit of the operational amplifier 51 outputs the output signal Vout21 whose waveform is similar to a variation in the pressure. In this case, when the charge signal Qi is not present between the charge signals Qi which are periodically produced (see time t2), the base voltage Vb21 of the output signal Vout21 is equal to or less than the reference voltage Vr due to the sinking phenomenon.

Although the output signal Vout21 is passed through the capacitor 57, and thus the direct-current part thereof is cut, the waveform of the output signal Vout21 in the shape of a pulse periodically appears, with the result that the capacitor 57 repeatedly performs charge and discharge. Consequently, the potential of the non-inverting input terminal of the operational amplifier 52 is lowered beyond the reference voltage Vr with the timing of the base voltage Vb21. In this way, the voltage between the base and the emitter of the npn transistor 42 in the base voltage adjustment circuit 40 is increased beyond the forward voltage, and thus the base current flows through the npn transistor 42, with the result that the npn transistor 42 is turned on. The reason for this is that the potential of the emitter of the npn transistor 42 is equal to or less than 1.0 V with respect to the potential (1.6 V) of the coupling point A.

Consequently, a current flows from the power supply Vdd through the npn transistor 42, and thus the potential of the non-inverting input terminal of the operational amplifier 52 is increased so as to be equal to the reference voltage Vr. Then, when the potential of the non-inverting input terminal of the operational amplifier 52 slightly exceeds the reference voltage Vr, the voltage between the base and the emitter of the transistor 42 is equal to or less than the forward voltage, with the result that the transistor 42 is returned to the off-state. In this way, the potential of the non-inverting input terminal of the operational amplifier 52 is maintained to be 1.0 V which is equal to the reference voltage Vr with the timing of the base voltage Vb21, that is, at time t2 in FIG. 6. Since the operational amplifier 52 uses the reference voltage Vr as the operation reference, when the potential of the non-inverting input terminal is equal to the reference voltage Vr, the base voltage Vb22 of the output signal Vout22 is also equal to the reference voltage Vr as shown in FIG. 6(c). Furthermore, even when the magnitude and the period of the charge signal Qi are changed, and thus the base voltage Vb21 of the output signal Vout21 of the operational amplifier 51 is lowered beyond the reference voltage Vr (see FIG. 6(b)) and is significantly varied, by the operation (function) of the base voltage adjustment circuit 40, the base voltage Vb22 of the output signal Vout22 which is the output of the operational amplifier 52 can be maintained to be equal in potential to the reference voltage Vr without being displaced from the reference voltage Vr (see FIG. 6(c)).

As described above, in the processing circuit 50 of the second embodiment, the integrator circuit and the amplifier circuit are individually formed with the two operational amplifiers 51 and 52, and the base voltage adjustment circuit 40 is arranged on the input side of the amplifier circuit in the subsequent stage, and thus the base voltage Vb22 of the output signal Vout22 is constantly equal to the reference voltage Vr. Consequently, as shown in FIG. 6(c), the output signal Vout22 is prevented from entering the failure diagnosis region, and thus it is possible to obtain the pressure detection device excellent in reliability. Since the amplifier circuit is added to the stage subsequent to the integrator circuit, and thus the output level of the output signal Vout22 can be increased, it is possible to enhance the resolution and the S/N ratio in the pressure detection, with the result that it is possible to realize the pressure detection device which is highly accurate and is highly resistant to external noise.

THIRD EMBODIMENT

A pressure detection device 10 according to the third embodiment will then be specifically described with reference to FIGS. 7 and 8.

Figure 7:
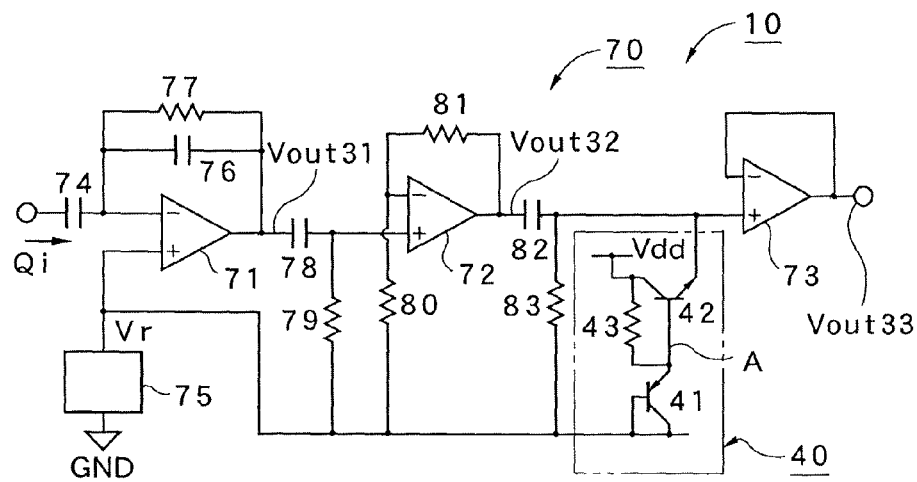
FIG. 7 is a schematic circuit diagram of the processing circuit of a pressure detection device according to the third embodiment of the present invention.

FIG. 7 shows only a processing circuit 70 which is extracted from the pressure detection device 10. The configuration of the detection portion 20 for detecting the combustion pressure P is the same as in the first embodiment. The processing circuit 70 shown in FIG. 7 includes three operational amplifiers 71 to 73 which are operated with a single power supply (for example, Vdd=5V). In this case, the operational amplifier 71 in the first stage forms the integrator circuit, the operational amplifier 72 in the subsequent stage forms the amplifier circuit and the operational amplifier 73 in the subsequent stage forms an amplifier circuit in the final stage. The amplifier circuit in the final stage formed with the operational amplifier 73 functions as voltage follower which performs impedance conversion.

The integrator circuit formed with the operational amplifier 71 and the amplifier circuit formed with the operational amplifier 72 have the same basic configuration as the processing circuit 50 of the second embodiment described previously. Hence, the description thereof will be omitted, and a description will be given of the voltage follower circuit formed with the operational amplifier 73 in the final stage and the peripheral circuit thereof and the base voltage adjustment circuit 40 arranged in the input terminal of the operational amplifier 73. Since the base voltage adjustment circuit 40 is also the same as the base voltage adjustment circuit 40 in the first embodiment, the same portions are identified with the same symbols, and the description of the internal circuit configuration will be omitted.

With respect to individual signals, Vout31 represents the output signal of the operational amplifier 71 forming the integrator circuit in the first stage, Vout32 represents the output signal of the operational amplifier 72 forming the amplifier circuit in the subsequent stage and Vout33 represents the output signal of the operational amplifier 73 forming the voltage follower in the final stage. Symbol 82 represents a capacitor which is connected between the output terminal of the operational amplifier 72 and the non-inverting input terminal of the operational amplifier 73 and which cuts the direct-current part of the output signal Vout32 from the operational amplifier 72. Furthermore, the non-inverting input terminal of the operational amplifier 73 is connected through a resistor 83 to the reference voltage Vr and is directly connected to the output terminal of the inverting input terminal. In this way, the operational amplifier 73 functions as the voltage follower circuit which is operated using the reference voltage Vr as the reference.

On the other hand, between the non-inverting input terminal of the operational amplifier 73 and the reference voltage Vr, the base voltage adjustment circuit 40 which is the characteristic part of the present invention is connected. In this case, the emitter of the npn transistor 42 in the base voltage adjustment circuit 40 is connected to the non-inverting input terminal of the operational amplifier 73, and the base and the collector of the pnp transistor 41 are connected to the reference voltage Vr.

Hence, in the processing circuit 70, the charge signal Qi fed from the detection portion 20 is integrated with the integrator circuit of the operational amplifier 71 in the first stage, and is output as the output signal Vout31. The output signal Vout31 is amplified with the amplifier circuit of the operational amplifier 72 in the subsequent stage at a predetermined amplification factor and is output as the output signal Vout32. Furthermore, the impedance conversion is performed with the voltage follower circuit of the operational amplifier 73 in the final stage, and the output signal Vout32 is output as the low-out impedance output signal Vout33; the processing circuit 70 has a series of functions described above.

The operation of the pressure detection device 10 according to the third embodiment will then be described with reference to a waveform diagram shown in FIG. 8 and FIG. 7.

Since the operations of the integrator circuit of the operational amplifier 71 and the amplifier circuit of the operational amplifier 72 are the same as in the second embodiment described previously, the description thereof will be omitted, and the operations of the voltage follower circuit of the operational amplifier 73 and the base voltage adjustment circuit 40 will be mainly be described.

FIG. 8(a) shows an example of the voltage waveform of the output signal Vout32 output from the operational amplifier 72 in the stage subsequent to the processing circuit 70 with respect to time t. As with the operational amplifier 52 (see FIG. 5) of the second embodiment, the operational amplifier 72 is operated as a non-inverting amplifier circuit, and amplifies the output signal Vout31 which is input at a predetermined amplification factor. In this way, the output signal Vout32 with a high crest value is output from the operational amplifier 72. Then, the output signal Vout32 is corrected by a charge and discharge operation with the charge capacitor 78 connected to the non-inverting input terminal of the operational amplifier 72 within one period with the reference voltage Vr in the center such that the area of voltage×time is ±0, and thus the sinking phenomenon occurs in which a base voltage Vb32 is displaced from the reference voltage Vr.

FIG. 8(b) shows an example of the voltage waveform of the output signal Vout33 output from the operational amplifier 73 in the final stage of the processing circuit 70. Since the operational amplifier 73 is operated as the voltage follower circuit, the magnitude of the output signal Vout33 is essentially equal to that of the output signal Vout32. The base voltage Vb33 of the output signal Vout33 is equal to the reference voltage Vr by the operation (function) of the base voltage adjustment circuit 40, and is thereby stabilized.

The operation of the base voltage adjustment circuit 40 in the third embodiment will then be described with reference to FIGS. 7 and 8.

A description will first be given of a case where the output signal Vout32 which is input to the operational amplifier 73 is not present. In this case, since the base voltage adjustment circuit 40 of FIG. 7 is operated as in the second embodiment described previously, the potential of the coupling point A is 1.6 V. The potential of the non-inverting input terminal of the operational amplifier 73 connected to the emitter of the npn transistor 42 is 1.0 V, and is equal to the reference voltage Vr. Hence, the base voltage adjustment circuit 40 is balanced with the coupling point A in the center, the non-inverting input terminal of the operational amplifier 73 is maintained to be equal in potential to the reference voltage Vr. Moreover, since the operational amplifier 73 serves as the voltage follower circuit in which the inverting input terminal and the output terminal are directly connected, the output signal Vout33 from the output terminal is equal in potential to the non-inverting input terminal, and is equal in potential to the reference voltage Vr.

A description will then be given of a case where in this state, the charge signal Qi appears at a predetermined period. In this case, since the operational amplifier 71 is operated as the integrator circuit, and the operational amplifier 72 is operated as the amplifier circuit, the base voltage Vb32 of the output signal Vout32 when the charge signal Qi is not present (for example, see time t3 in FIG. 8) between the charge signals Qi which are periodically produced is equal to or less than the reference voltage Vr shown in FIG. 8(a) due to the sinking phenomenon.

Although the output signal Vout32 is passed through the capacitor 82, and thus the direct-current part thereof is cut, the waveform of the output signal Vout32 in the shape of a pulse periodically appears, with the result that the capacitor 82 repeatedly performs charge and discharge. In this way, the potential of the non-inverting input terminal of the operational amplifier 73 in the final stage is lowered beyond the reference voltage Vr with the timing of the base voltage Vb32. Consequently, as in the operation in the second embodiment described previously, the voltage between the base and the emitter of the npn transistor 42 in the base voltage adjustment circuit 40 is increased beyond the forward voltage, and thus the base current flows through the npn transistor 42, with the result that the npn transistor 42 is turned on. A current flows from the power supply Vdd through the npn transistor 42, and thus the potential of the non-inverting input terminal of the operational amplifier 73 is increased so as to be equal to the reference voltage Vr. Then, when the potential of the non-inverting input terminal slightly exceeds the reference voltage Vr, the voltage between the base and the emitter of the transistor 42 is equal to or less than the forward voltage, with the result that the transistor 42 is returned to the off-state.

Figure 8:
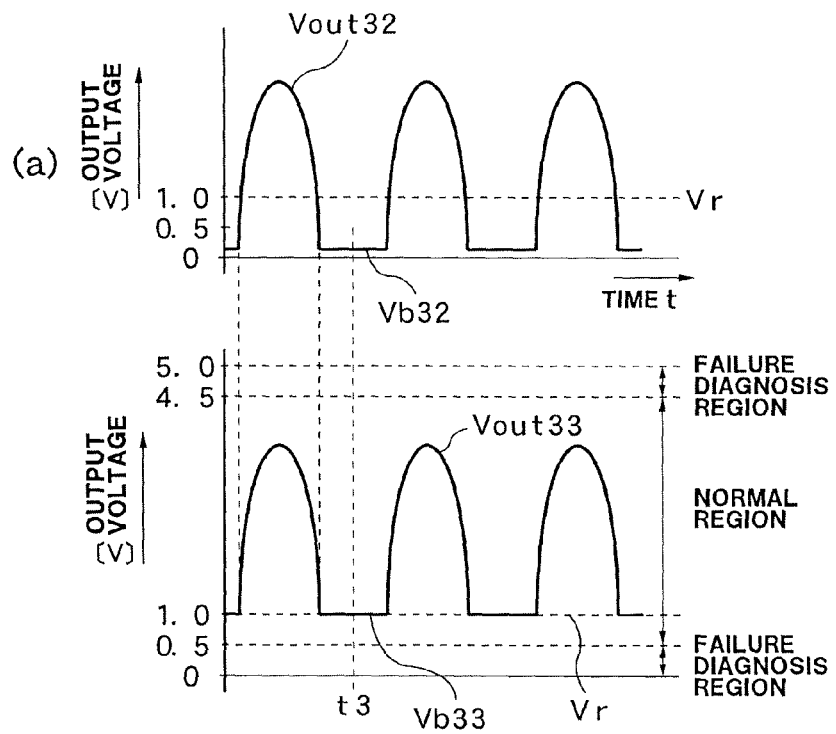
FIG. 8 is a signal waveform diagram illustrating the operation of the pressure detection device.

In this way, the potential of the non-inverting input terminal of the operational amplifier 73 is maintained to be 1.0 V which is equal to the reference voltage Vr with the timing of the base voltage Vb32, that is, at time t3 in FIG. 8. Then, since the operational amplifier 73 is operated as the voltage follower circuit, when the potential of the non-inverting input terminal is equal to the reference voltage Vr at time t3, the base voltage Vb33 of the output signal Vout33 is also equal to the reference voltage Vr as shown in FIG. 8(b). Consequently, even when the magnitude and the period of the charge signal Qi are changed, and thus the base voltage Vb32 of the output signal Vout32 of the operational amplifier 72 is lowered beyond the reference voltage Vr as shown in FIG. 8(a) and is significantly varied, the base voltage Vb33 of the output signal Vout33 which is the output of the operational amplifier 73 can be maintained to be equal in potential to the reference voltage Vr without being displaced from the reference voltage Vr as shown in FIG. 8(b).

As described above, since in the processing circuit 70 of the third embodiment, the integrator circuit and the two amplifier circuits are formed with the three operational amplifiers 71 to 73, and the base voltage adjustment circuit 40 is connected to the input side of the amplifier circuit in the final stage, the processing circuit 70 is operated such that the base voltage Vb33 of the output signal Vout33 is constantly equal to the reference voltage Vr. Consequently, it is possible to obtain the same effects as in the first and second embodiments. Since in the processing circuit 70 of the third embodiment, the voltage follower circuit is added to the final stage, the output impedance of the output signal Vout33 can be reduced to an extremely low value, with the result that it is possible to realize the pressure detection device 10 excellent in noise resistance.

FOURTH EMBODIMENT

A pressure detection device 90 according to the fourth embodiment will then be described with reference to FIGS. 9 and 10.

The pressure detection device 90 according to the fourth embodiment has a different overall structure. In FIG. 10, the specific structure of a detection portion 91 is shown. An example of an engine to which the pressure detection device 90 is fitted will first be described with reference to FIG. 9. In the pressure detection device 90 according to the fourth embodiment, the detection portion 91 provided at the tip end is incorporated in the tip end portion of a fuel injection device.

Figure 9:
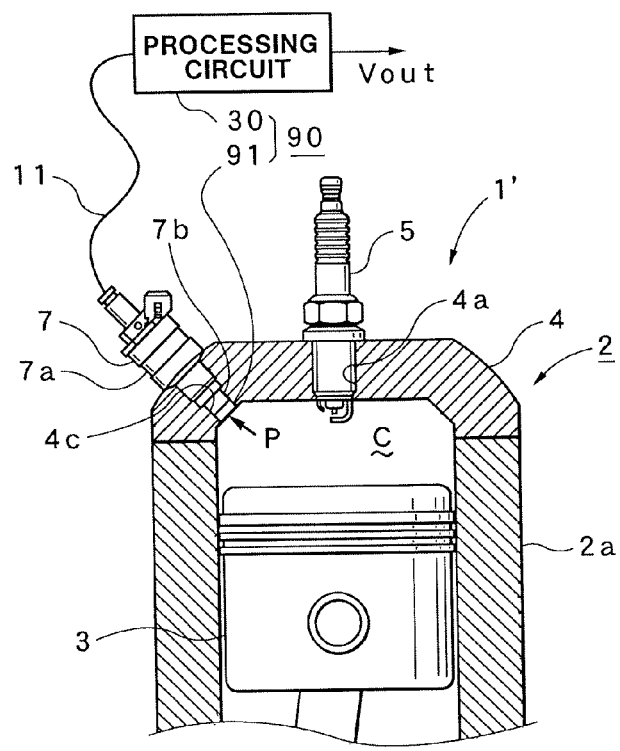
FIG. 9 is a schematic configuration diagram showing an engine to which a pressure detection device according to a fourth embodiment that is a preferred embodiment of the present invention.

Symbol 1' shown in FIG. 9 represents an automobile engine to which the pressure detection device 90 according to the fourth embodiment is fitted. Since the engine 1' has the same configuration as the engine 1 to which the pressure detection device 10 of the first to third embodiments described previously is fitted and which is shown in FIG. 1, the same portions are identified with the same numbers, and the repeated description will be omitted.

The engine 1' includes the spark plug 5 which is fitted to the cylinder head 4 to perform ignition for detonating an air-fuel mixture within the combustion chamber C and the fuel injection device 7 which is fitted to the cylinder head 4 to inject fuel into the combustion chamber C. In this case, two communication holes 4a and 4c which penetrate the cylinder head 4 to make the combustion chamber C communicate with the outside are formed, the spark plug 5 is fitted to the one communication hole 4a and the fuel injection device 7 is fitted to the other communication hole 4c. Furthermore, the fuel injection device 7 includes a main body portion 7a which is located outside the combustion chamber C and a cylindrical tip end portion 7b which is extended from the main body portion 7a toward the combustion chamber C.

As shown in FIG. 9, the pressure detection device 90 of the fourth embodiment includes the detection portion 91 which is provided at the tip end portion 7b of the fuel injection device 7 and the processing circuit 30 which is connected to the detection portion 91 through the conductive portion 11. The detection portion 91 is formed in the shape of a ring and has the function of detecting an internal pressure (combustion pressure: arrow P) within the combustion chamber C. Hence, the processing circuit 30 receives, with the conductive portion 11, a signal from the detection portion 91 and outputs an output signal Vout on which signal processing is performed therewithin to an external engine control portion (not shown). Since the conductive portion 11 and the processing circuit 30 of the fourth embodiment and the piezoelectric element 21 incorporated in the detection portion 91 which will be described later are the same as in the first to third embodiments described previously, the same portions are identified with the same numbers, and the repeated description will be omitted.

Figure 10:
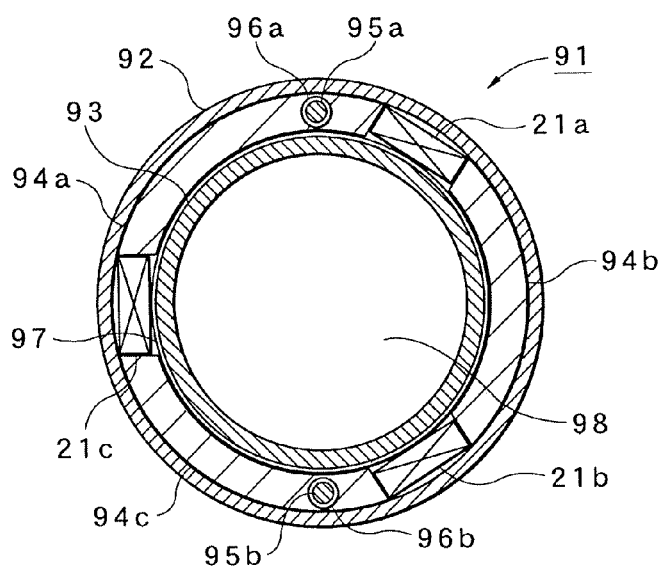
FIG. 10 is a cross-sectional view showing the structure of the detection portion of the pressure detection device.

FIG. 10 shows a cross-sectional view of the vicinity of piezoelectric elements arranged within the detection portion 91 which is taken along the radial direction (perpendicularly in the axial direction) of the detection portion 91. As shown in FIG. 10, the illustrated detection portion 91 includes three piezoelectric elements 21a, 21b and 21 c which form a pressure detection element, and they are arranged substantially at regular intervals along the circumferential direction in a gap between a front outer enclosure 92 which is the conductive enclosure of the detection portion 91 and is formed in the shape of a ring and a front inner enclosure 93. In the following discussion, the description of the piezoelectric element 21 includes three piezoelectric elements 21a, 21b and 21c.

When the piezoelectric element 21 is arranged, in the gaps between the piezoelectric elements 21a, 21b and 21c, insulating spacers 94a, 94b and 94c are interposed, and the piezoelectric elements 21a, 21b and 21c are arranged substantially at regular intervals along the circumferential direction. Furthermore, in the spacers 94a and 94c, spacer through holes 96a and 96b for passing connection terminals 95a and 95b through which a charge signal from the piezoelectric element 21 is transmitted to the outside are provided, and the connection terminals 95a and 95b penetrate the spacer through holes 96a and 96b. In this way, the connection terminals 95a and 95b are insulted by the spacers 94a and 94c from the front outer enclosure 92 and the front inner enclosure 93. In this configuration, the combustion pressure P of the engine 1' can be received by the piezoelectric element 21. On the other hand, although not illustrated, the electrodes of the three piezoelectric elements 21a to 21c are connected in parallel within the detection portion 91, and are electrically connected through the connection terminals 95a and 95b. Then, the obtained charge signal Qi is fed through the conductive portion 11 to the processing circuit 30 (see FIG. 9).

As the material of the spacers 94a to 94c, a ceramic (alumina, zirconia) or the like can be utilized but the material is not limited as long as it is an insulating material. On the entire outer circumference of the front inner enclosure 93, an annular insulating film 97 is arranged so as to insulate the electrodes (not shown) on the inner side of the piezoelectric element 21 arranged in the circumferential direction from the front inner enclosure 93. As described above, since a plurality of piezoelectric elements 21 are arranged within the detection portion 91 along the circumferential direction at regular intervals, they can receive the pressure from the outside in a well-balanced manner and uniformly, and thereby can perform highly accurate pressure detection. Since a structure for transmitting the combustion pressure P of the engine 1' to the piezoelectric element 21 and the like are not directly related to the present invention, their description will be omitted.

On the other hand, since a hollow 98 is present within the detection portion 91, the tip end portion 7b of the fuel injection device 7 is arranged in the hollow 98, and thus the fuel can be injected into the combustion chamber C (see FIG. 9). Although in the fourth embodiment, the three piezoelectric elements 21a to 21c are illustrated, the number of piezoelectric elements 21a is not limited. In other words, the number may be increased or decreased. Although the case where as the processing circuit 30 of the fourth embodiment, the processing circuit 30 (see FIG. 3) of the first embodiment is used is illustrated, the processing circuit 50 (see FIG. 5) of the second embodiment may be used or the processing circuit 70 (see FIG. 7) of the third embodiment may be used. The piezoelectric element 21 of the fourth embodiment is the same as the piezoelectric elements 21 of the first to third embodiments described previously.

Since as described above, the detection portion 91 is incorporated in the tip end portion of the fuel injection device 7, and thus the pressure detection device 90 of the fourth embodiment is fitted to the engine, it is not necessary to additionally provide a communication hole in the cylinder head 4, with the result that it can contribute to the miniaturization of the engine and the simplification of the engine structure.

Although the preferred embodiments (the first to fourth embodiments) are described in detail above, the present invention is not limited to such embodiments, and modifications, additions and deletions can be arbitrarily performed on the detailed configurations, the shapes, the materials, the numbers, the methods and the like without departing from the spirit of the present invention. For example, although the case where the base voltage adjustment circuit 40 is formed with the transistor pair using the pnp transistor 41 and the npn transistor 42 is illustrated, the base voltage adjustment circuit 40 may be replaced with another circuit configuration with the same function. Although here, as the transistor pair, complementary transistors are preferably used, the transistors of another type may be adopted.

INDUSTRIAL APPLICABILITY

The pressure detection device according to the present invention can be widely utilized for not only the detection of the combustion pressure of an engine but also pressure detection in various applications.

The invention claimed is:

1. A pressure detection device comprising:
a pressure detection element which receives pressure so as to output a detection signal corresponding to the pressure; and
a processing circuit which processes and outputs the detection signal output from the pressure detection element,
wherein the processing circuit includes at least:
an integrator circuit which uses a reference voltage set to have a predetermined magnitude as an operation reference and integrates the detection signal so as to convert the detection signal into a voltage waveform; and
a base voltage adjustment circuit which is connected between an input terminal and an output terminal of the integrator circuit and adjusts a magnitude of a base voltage that is a potential when the detection signal in an output signal output from the integrator circuit is not present.

2. The pressure detection device according to claim 1, wherein the base voltage adjustment circuit is formed with a transistor pair using a pnp transistor and an npn transistor.

3. The pressure detection device according to claim 2, wherein as the transistor pair, complementary transistors are used.

4. The pressure detection device according to claim 3, wherein the base voltage adjustment circuit can adjust the magnitude of the base voltage such that the base voltage is equal to the reference voltage.

5. The pressure detection device according to claim 2, wherein the base voltage adjustment circuit can adjust the magnitude of the base voltage such that the base voltage is equal to the reference voltage.

6. The pressure detection device according to claim 1, wherein the base voltage adjustment circuit can adjust the magnitude of the base voltage such that the base voltage is equal to the reference voltage.

7. The pressure detection device according to claim 1, wherein the integrator circuit is formed with a computation amplifier circuit which is operated with a single power supply.

8. A pressure detection device comprising:
a pressure detection element which receives pressure so as to output a detection signal corresponding to the pressure; and
a processing circuit which processes and outputs the detection signal output from the pressure detection element,
wherein the processing circuit includes:
an integrator circuit which uses a reference voltage set to have a predetermined magnitude as an operation reference and integrates the detection signal so as to convert the detection signal into a voltage waveform;
at least one or more amplifier circuits which use a reference voltage set to have a predetermined magnitude as an operation reference and amplify an output signal from the integrator circuit; and
a base voltage adjustment circuit which is connected between a supply portion of the reference voltage fed to the amplifier circuit and an input terminal of at least one of the amplifier circuits and which adjusts a magnitude of a base voltage that is a potential when the detection signal in the output signal output from the amplifier circuit is not present.

9. The pressure detection device according to claim 8, wherein the base voltage adjustment circuit is formed with a transistor pair using a pnp transistor and an npn transistor.

10. The pressure detection device according to claim 9, wherein as the transistor pair, complementary transistors are used.

11. The pressure detection device according to claim 10, wherein the base voltage adjustment circuit can adjust the magnitude of the base voltage such that the base voltage in the output signal of the amplifier circuit is equal to the reference voltage fed to the amplifier circuit.

12. The pressure detection device according to claim 9, wherein the base voltage adjustment circuit can adjust the magnitude of the base voltage such that the base voltage in the output signal of the amplifier circuit is equal to the reference voltage fed to the amplifier circuit.

13. The pressure detection device according to claim 8, wherein the base voltage adjustment circuit can adjust the magnitude of the base voltage such that the base voltage in the output signal of the amplifier circuit is equal to the reference voltage fed to the amplifier circuit.

* * * * *